(12) United States Patent
Tanaka (10) Patent No.: US 11,553,112 B2
(45) Date of Patent: Jan. 10, 2023

(54) IMAGE CAPTURING APPARATUS, METHOD, AND NON-TRANSITORY COMPUTER-READABLE STORAGE MEDIUM

(71) Applicant: CANON KABUSHIKI KAISHA, Tokyo (JP)

(72) Inventor: Tomonori Tanaka, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/446,516

(22) Filed: Aug. 31, 2021

(65) Prior Publication Data
US 2022/0070336 A1    Mar. 3, 2022

(30) Foreign Application Priority Data
Sep. 3, 2020 (JP) ............................. JP2020-148448

(51) Int. Cl.
*H04N 13/296* (2018.01)
*H04N 5/232* (2006.01)
*H04N 5/08* (2006.01)

(52) U.S. Cl.
CPC ............... *H04N 5/08* (2013.01); *H04N 5/232* (2013.01); *H04N 13/296* (2018.05)

(58) Field of Classification Search
CPC ............................. H04N 13/296; H04N 5/232
See application file for complete search history.

(56) References Cited

U.S. PATENT DOCUMENTS 6,606,127 B1    8/2003  Fang et al.
9,185,390 B2 *  11/2015 Kamiya ............ H04N 5/232933
9,967,548 B2 *  5/2018  Yoshizawa ........... H04N 13/296
(Continued)

FOREIGN PATENT DOCUMENTS

JP    2016-142785 A    8/2016

OTHER PUBLICATIONS

The above documents and the non-patent literature documents below were cited in a European Search Report dated Jan. 25, 2022, that issued in the corresponding European Patent Application No. 21193740.4.

(Continued)

*Primary Examiner* — Brian P Yenke
(74) *Attorney, Agent, or Firm* — Cowan, Liebowitz & Latman, P.C.

(57) ABSTRACT

An image capturing apparatus comprising an image capturing unit, a synchronization control unit performing synchronization with the second synchronization signal such that the captured image is output to an external devise in synchronism with the second synchronization signal; a determination unit determining whether the synchronization is stable; and a mode control unit switching an operation mode between a first operation mode and a second operation mode, in response to an instruction for switching the operation mode, wherein in a case where an instruction for switching the operation mode from the second operation mode to the first operation mode has been input and it is determined that the synchronization is stable, the mode control unit switches the operation mode from the second operation mode to the first operation mode.

14 Claims, 6 Drawing Sheets

(56) References Cited

U.S. PATENT DOCUMENTS

| | | | |
|---|---|---|---|
| 10,834,297 B2* | 11/2020 | Saito | H04N 5/247 |
| 11,068,020 B2* | 7/2021 | Handa | H04N 21/4305 |
| 11,240,405 B2* | 2/2022 | Mikawa | H04N 5/073 |
| 11,381,787 B2* | 7/2022 | Nakatani | H04N 7/54 |
| 2002/0085844 A1 | 7/2002 | Tashiro et al. | |
| 2007/0008416 A1* | 1/2007 | Kim | H04N 7/181 |
| | | | 348/E7.086 |
| 2011/0013037 A1* | 1/2011 | Irikura | H04N 5/23209 |
| | | | 348/222.1 |
| 2012/0044001 A1 | 2/2012 | Tanaka | |
| 2018/0329451 A1* | 11/2018 | Handa | H04L 67/00 |
| 2020/0382680 A1* | 12/2020 | Mikawa | H04N 5/772 |
| 2021/0281805 A1* | 9/2021 | Nakatani | H04N 5/232941 |
| 2022/0028117 A1* | 1/2022 | Mizohana | G06T 7/0004 |

OTHER PUBLICATIONS

Anonymous: "HD Memory Card Camera Recorder GY-HM890U/ GY-HM890E GY-HM890CHU/GY-HM890CHE GY-HM890RE/ GY-HM890RCHE GY-HM850U/GY-HM850E GY-HM850CHU/ GY-HM850CHE GY-HM850RE/GY-HM850RCHE Bedienungsanleitung", Dec. 31, 2019 (Dec. 31, 2019), pp. 1-212, XP055878172, Retrieved from the Internet: URL:https://manual3.jvckenwood.com/pro/mobil/gy/1st1586-002ge/download.php?filename=/pro/mobil/gy/1st1586-002ge/pdf/ LST1586-002C.pdf.

Anonymous: "Operating Instruction HD Integrated Camera AW-HE130WP", , Dec. 31, 2017 (Dec. 31, 2017), pp. 1/126, XP055878192, Retrieved from the Internet: URL:https://pro-av.panasonic.net/manual/pdf/AW-HE130WPE_KPE_ OPERATION(VQT5L27A-2)_E.pdf.

* cited by examiner

IMAGE CAPTURING APPARATUS, METHOD, AND NON-TRANSITORY COMPUTER-READABLE STORAGE MEDIUM

BACKGROUND OF THE INVENTION

Field of the Invention

The present disclosure relates to an image capturing apparatus, a method, and a non-transitory computer-readable storage medium.

Description of the Related Art

When switching a plurality of camera images by a switcher or the like, there is known a Genlock function as a function capable of switching the images without disturbing them. There is also available a technique for switching an operation mode of a camera itself from a normal image capturing mode to a standby mode (e.g., a mode of stopping image capturing processing and facing the image capturing apparatus backward). In addition, there is further available a method of enabling a Genlock function and outputting a black image when Genlock is unstable (see Japanese Patent Laid-Open No. 2016-142785).

In the above technique, a problem is posed such that in a case where Genlock is unstable when the operation mode of the camera is restored from the standby mode to the normal image capturing mode immediately after the Genlock function is enabled, the black image is output, and an actual image cannot be output.

SUMMARY OF THE INVENTION

The present disclosure provides a technique for stably outputting an image even if the camera operation mode is shifted from the standby mode to the normal image capturing mode immediately after the Genlock function is enabled.

An exemplary embodiment relates to an image capturing apparatus comprising, an image capturing unit configured to capture an image, a synchronization control unit configured to perform, in accordance with a second synchronization signal which has been input, synchronization with the second synchronization signal such that the captured image is output to an external devise in synchronism with the second synchronization signal, a determination unit configured to determine whether the synchronization is stable, and a mode control unit configured to switch an operation mode of the image capturing apparatus between a first operation mode for outputting the captured image to the external device and a second operation mode for not outputting the captured image to the external device, in response to an instruction for switching the operation mode, wherein in a case where an instruction for switching the operation mode from the second operation mode to the first operation mode has been input and it is determined that the synchronization is stable, the mode control unit switches the operation mode from the second operation mode to the first operation mode.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
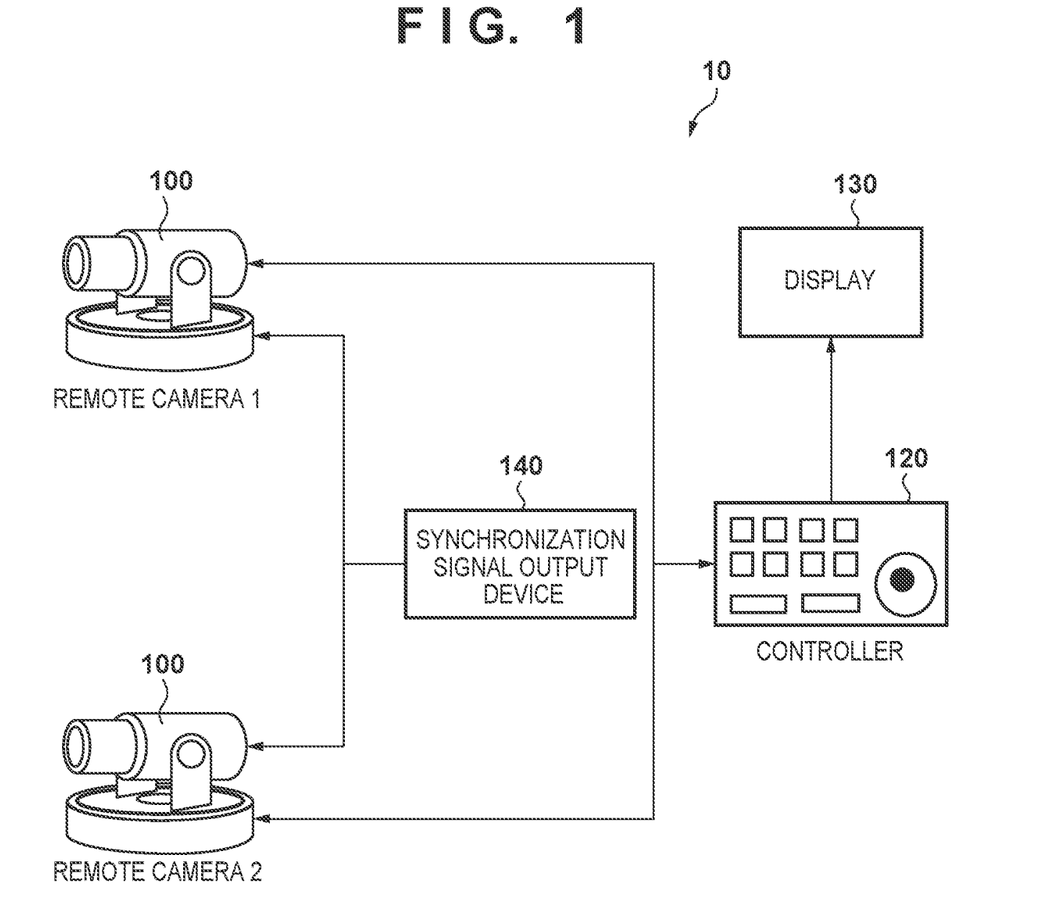
FIG. 1 is a view showing an example of the system arrangement corresponding to an embodiment.

The first embodiment will be described in detail below with reference to the accompanying drawings. FIG. 1 shows the arrangement example of an image capturing system corresponding to the first embodiment. An image capturing system 10 according to this embodiment includes a plurality of cameras 100, a controller 120, a display 130, and a synchronization signal output device 140. This embodiment assumes that image outputs from the two cameras 100 (a camera 1 and a camera 2) are switched by the controller 120 and displayed on the display 130. In addition, a synchronization signal output from the synchronization signal output device 140 is input to the camera 1 and the camera 2. The image outputs from the camera 1 and the camera 2 are synchronized in accordance with the input synchronization signal. Accordingly, even if the controller 120 switches the image output from the camera 2 to the camera 1, the image will not be interrupted. In this embodiment, a case in which the two cameras 100 are switched will be described. However, three or more cameras 100 may be connected to synchronize the image outputs, and the image outputs may be switched by the controller 120.

Figure 2A:
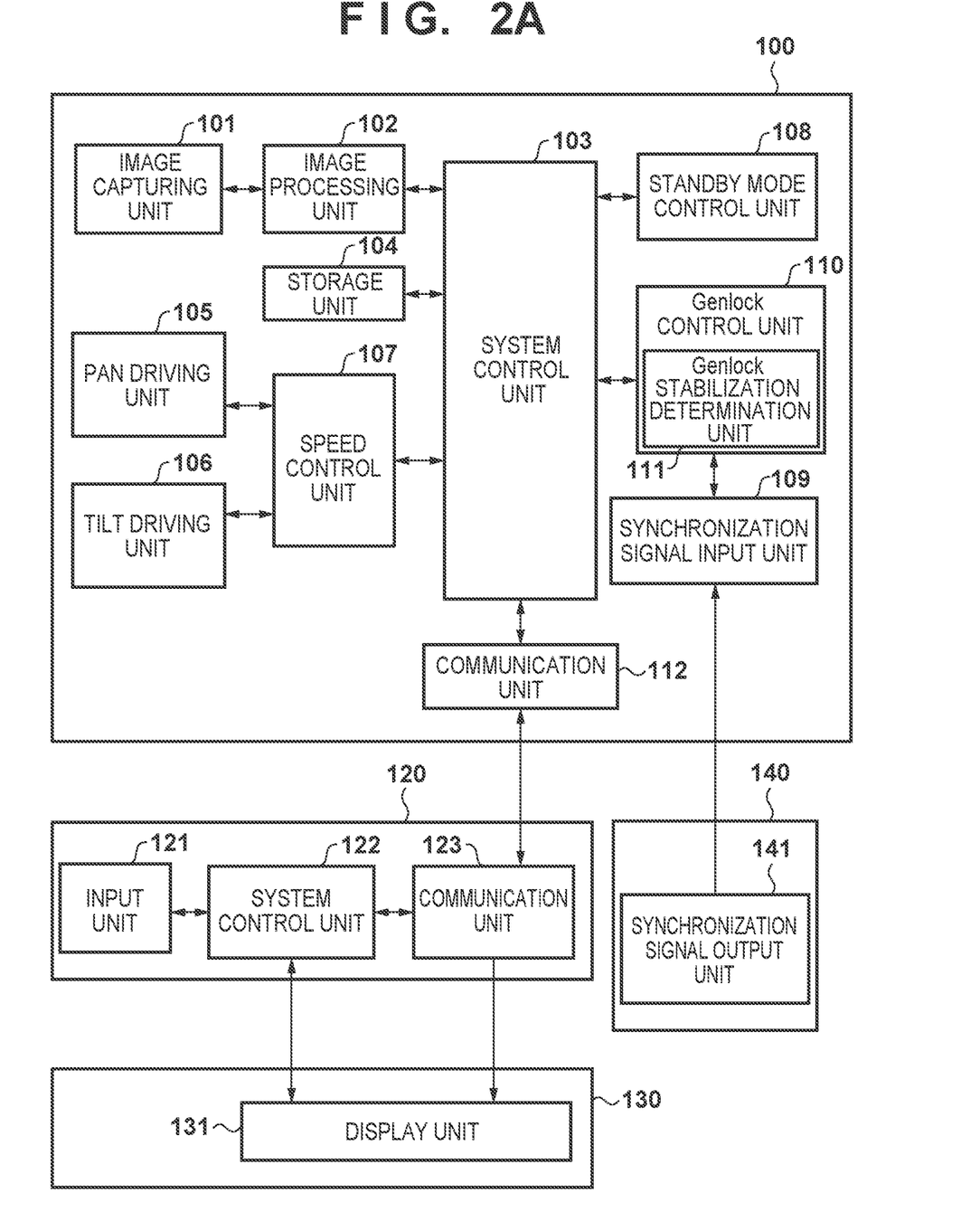
FIG. 2A is a block diagram showing an example of the functional arrangement of the respective devices in the system arrangement corresponding to the embodiment.

The functional arrangement of the respective devices constituting the image capturing system 10 will be described with reference to FIG. 2A. FIG. 2A shows an example of the functional arrangements of the respective devices of the image capturing system 10 corresponding to this embodiment.

The camera 100 can be called an image capturing apparatus, a remote camera, or a network camera and captures an object image in a monitoring target area. The camera 100 can be arranged to include an image capturing unit 101, an image processing unit 102, a system control unit 103, a storage unit 104, a pan driving unit 105, a tilt driving unit 106, a speed control unit 107, a standby mode control unit 108, a synchronization signal input unit 109, a Genlock control unit 110, a Genlock stabilization determination unit 111, and a communication unit 112. The respective constituent elements will be described below.

The image capturing unit 101 is formed from an optical system such as a lens and an image capturing element such as a COMS image sensor. The image capturing unit 101 captures an object image in the monitoring target area and generates an analog image signal. The analog image signal is converted into a digital image signal and output to the image processing unit 102. The image processing unit 102 performs compression coding processing and predetermined image processing including development processing such as debayer processing, white balance processing, or tone conversion processing on the digital image signal output from the image capturing unit 101 to generate image data and outputs the image data to the system control unit 103.

The system control unit 103 controls the overall operation of the cameras 100. More specifically, the system control unit 103 outputs, to the controller 120 via the communication unit 112, image data captured by the image capturing unit 101 and obtained via the image processing unit 102. In addition, the system control unit 103 receives a control command from the controller 120 via the communication unit 112 and performs processing corresponding to the command by analyzing the received command. For example, if the system control unit 103 receives a command for setting image quality adjustment for the image processing unit 102 or a command for setting a pan/tilt operation for the pan driving unit 105 and the tilt driving unit 106, the system control unit 103 analyzes the corresponding command and executes the image quality adjustment or the pan/tilt operation. In addition, if the system control unit 103 receives a command for instructing Genlock enabling/disabling, the system control unit 103 instructs enabling or disabling to the Genlock control unit 110.

The storage unit 104 stores control data in the cameras 100 and the captured image data. More specifically, the storage unit 104 can store an image quality adjustment parameter, a network setting value, or image capturing direction information of each camera 100. The image capturing direction information may be, for example, the pan and tilt angles in the pan driving unit 105 and the tilt driving unit 106. The system control unit 103 can obtain the previously set value with reference to the storage unit 104 even if each camera 100 is activated again.

The pan driving unit 105, the tilt driving unit 106, and the speed control unit 107 form a direction control mechanism for controlling the image capturing direction of each camera 100. The pan driving unit 105 is formed from a mechanism driving system for performing the pan operation in accordance with the control command from the system control unit 103 and a motor serving as its driving source. By driving the motor, the pan driving mechanism is driven in the pan direction. The tilt driving unit 106 is formed from a mechanism driving system for performing the tilt operation in accordance with the control command from the system control unit 103 and a motor serving as its driving source. By driving the motor, the tilt driving mechanism is driven in the tilt direction. The speed control unit 107 calculates a subsequently instructed driving speed based on the current speed, the target speed, the acceleration value, and the information of an acceleration/deceleration table in accordance with the control command from the system control unit 103. The speed control unit 107 then instructs to drive the pan driving unit 105 and the tilt driving unit 106 in accordance with the calculated speeds.

The standby mode control unit 108 performs mode switching control for switching the operation mode of each camera 100 between the normal image capturing mode (the first operation mode) and the standby mode (the second operation mode). The standby mode control unit 108 determines whether a standby mode/normal image capturing mode switching instruction (shift instruction) is input from the controller 120 via the communication unit 112 and the system control unit 103. The standby mode control unit 108 then sets the operation mode of each camera 100. The standby mode control unit 108 may indicate, for example, the current operation mode using a set value of 0 or 1. For example, 0 may indicate the standby mode, and 1 may indicate the normal image capturing mode.

The system control unit 103 refers to the set value of the standby mode control unit 108 to determine the operation mode. If the operation mode is the normal image capturing mode serving as the first operation mode, the image data is outputted to the controller 120 via the processing units, which are the image capturing unit 101, the image processing unit 102, the system control unit 103, and the communication unit 112. In addition, pan/tilt driving using the pan driving unit 105, the tilt driving unit 106, and the speed control unit 107 is possible. In the standby mode serving as the second operation mode, the system control unit 103 stops the above output of the image data to the controller 120. In addition, pan/tilt driving using the pan driving unit 105, the tilt driving unit 106, and the speed control unit 107 is stopped. Note that although the standby mode control unit 108 is described as a block independent of the system control unit 103, but may be formed as part of the system control unit 103.

The synchronization signal input unit 109 inputs the synchronization signal output from the synchronization signal output device 140 to each camera 100. The Genlock control unit 110 synchronizes the first synchronization signal generated by the Genlock control unit 110 with the second synchronization signal input from the synchronization signal input unit 109 and performs overall synchronization control of the system control unit 103 and each camera 100. Accordingly, the synchronization signal input unit 109 can output an image to the controller 120 in synchronism with the second synchronization signal in the normal image capturing mode.

In addition, the Genlock control unit 110 can performs Genlock enabling/disabling switching control. The Genlock enabling indicates that synchronization with the synchronization signal is started in response to a Genlock enabling instruction from the controller 120 in a state in which the synchronization signal is input to the synchronization signal input unit 109. On the other hand, the Genlock disabling indicates that synchronization with the synchronization signal is stopped in response to a Genlock disabling instruction from the controller 120 and control is performed by only the synchronization signal generated by the Genlock control unit 110. The Genlock technique is known well, and a description thereof will be omitted.

The Genlock stabilization determination unit 111 determines whether the two synchronization signals are stably synchronized (whether Genlock is stable). As a determination method, for example, a difference between an H/V synchronization signal (the first synchronization signal) generated by the Genlock control unit 110 and an H/V synchronization signal (the second synchronization signal) input from the synchronization signal input unit 109 is obtained, and if the difference falls within a ±predetermined number of clocks for a predetermined period or more, it is determined that the two synchronization signals are stably synchronized. If the difference does not fall within a ±predetermined number of clocks for a predetermined period or more, it is determined that the two synchronization signals are not stably synchronized. When the Genlock control unit 110 enables Genlock to start synchronization, this requires about several seconds until the first synchronization signal is stably synchronized with the second synchronization signal input from the synchronization signal input unit 109. During this period, the synchronization becomes unstable for about several seconds (for example 7 sec) from the start of the Genlock. As another determination method, the Genlock control unit 110 may determine whether synchronization is stable by detecting the elapse of the predetermined period (corresponding to 7 sec described above) from the start of synchronization after the Genlock enabling. The communication unit 112 performs processing of network communication by, for example, a LAN.

The controller 120 operates as a display control device or a switching device or switcher for switching an image displayed on the display 130. The controller 120 includes an input unit 121, a system control unit 122, and a communication unit 123. The input unit 121 is formed from buttons, a joystick, and the like and accepts various kinds of operations from the user. These operations include, for example, a switching operation of each camera 100 configured to perform image output, a switching operation between the standby mode and the normal image capturing mode of each camera 100, Genlock enabling, Genlock disabling, and the like. The system control unit 122 transmits a control command corresponding to an operation of each camera 100 via the communication unit 123 in accordance with the operation accepted from the user. The communication unit 123 performs processing of the network communication by a LAN.

The display 130 includes a display unit 131. The display 130 receives, via the controller 120, the image data output from each camera 100 and displays it on the display unit 131. The display unit 131 is a display device such as a liquid crystal display.

The synchronization signal output device 140 includes a synchronization signal output unit 141. The synchronization signal output unit 141 outputs a synchronization signal (corresponding to the second synchronization signal described above), which will be a reference signal for synchronously operating the plurality of cameras 100. This embodiment assumes that the synchronization signal is input from the synchronization signal output device 140 to the synchronization signal input unit 109 of each camera 100.

Next, an example of the hardware arrangement of each camera 100 will be described with reference to FIG. 2B. A CPU 201 is a device for performing overall control of each camera 100 and calculation, processing, and management of the data. The CPU 201 serves as the system control unit 103, the speed control unit 107, the standby mode control unit 108, the Genlock control unit 110, and the like. In addition, the CPU 201 may also function as the image processing unit 102 for compressing and encoding the digital image signal output from the camera unit 206 and generating image data. Alternatively, these functional blocks may be individually or collectively implemented by a dedicated processor.

A RAM 202 is a volatile memory and used as a temporary storage area such as a main memory or a work area of the CPU 201. A ROM 203 is a nonvolatile memory and stores image data, other data, various kinds of programs operated by the CPU 201, and the like in predetermined areas. The CPU 201 controls the respective components of each camera 100 using the RAM 202 as the work memory in accordance with, for example, the programs stored in the ROM 203. Note that the programs operated by the CPU 201 are not limited to the programs stored in the ROM 203, but may be stored in a storage device 204.

The storage device 204 is formed from, for example, a magnetic disk such as an HDD or a flash memory and can function as the storage unit 104. The storage device 204 stores application programs, the OS, the control program, associated programs, and the like. The storage device 204 can read out or write data based on the control of the CPU 201. The storage device 204 may be used in place of the RAM 202 and the ROM 203.

A communication device 205 is a communication interface for communicating with the controller 120 based on the control of the CPU 201 and can function as the communication unit 112. The communication device 205 can include wireless communication modules. These modules include, as known circuit mechanisms, an antenna system, an RF transceiver, at least one amplifier, a tuner, at least one oscillator, a digital signal processor, a CODEC chipset, a subscriber identification module card, a memory, and the like. The communication device 205 can also include a wired communication module for wired connection. The wired communication module can communicate with another device via at least one external port. In addition, the communication device 205 can also include various kinds of software components for processing data. The external port is connected to another device directly via Ethernet, USB, IEEE1394, or the like or indirectly via a network. Note that the software for implementing the functions equivalent to those of the respective devices described above can be implemented in place of the hardware devices.

A camera unit 206 can function as the image capturing unit 101 including the image capturing optical system, the image capturing sensor such as a CCD or CMOS sensor, and the development processing unit, and the pan driving unit 105 and the tilt driving unit 106 including the image capturing optical system and a movable platform for controlling the image capturing direction and the angle of view. The camera unit 206 captures the image of a predetermined region within the monitoring target area, which is a real space, and generates that image. In the camera unit 206, the analog image signal obtained by photoelectric transformation using the image capturing element such as the CCD or CMOS image sensor is converted into the digital image signal by A/D conversion, and the digital image signal is output to the CPU 201. In the camera unit 206, for example, an image of a predetermined number of frames (for example, 30 frames) per second is obtained in addition to a still image, so that a moving image (live video) of 30 fps in the monitoring area can be obtained. An operation unit 207 is formed from, for example, buttons, cross keys, a touch panel, and the like and accepts an operation input from the user.

Figure 2B:
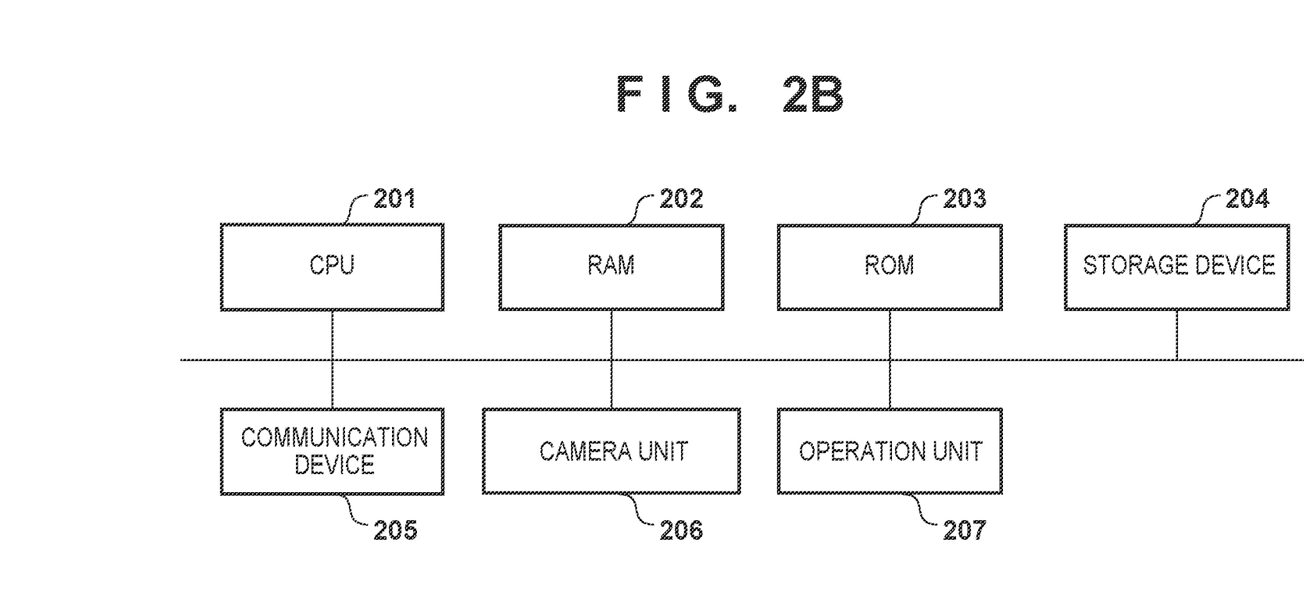
FIG. 2B is a block diagram showing an example of the hardware arrangement of an image capturing apparatus corresponding to the embodiment.

FIG. 2B is the hardware arrangement view of each camera 100, and the hardware arrangement of the controller 120 can comply with that of FIG. 2B. In this case, the camera unit 206 is excluded from the arrangement. In addition, the operation unit 207 functions as the input unit 121 and can further include a keyboard or a mouse.

Figure 3:
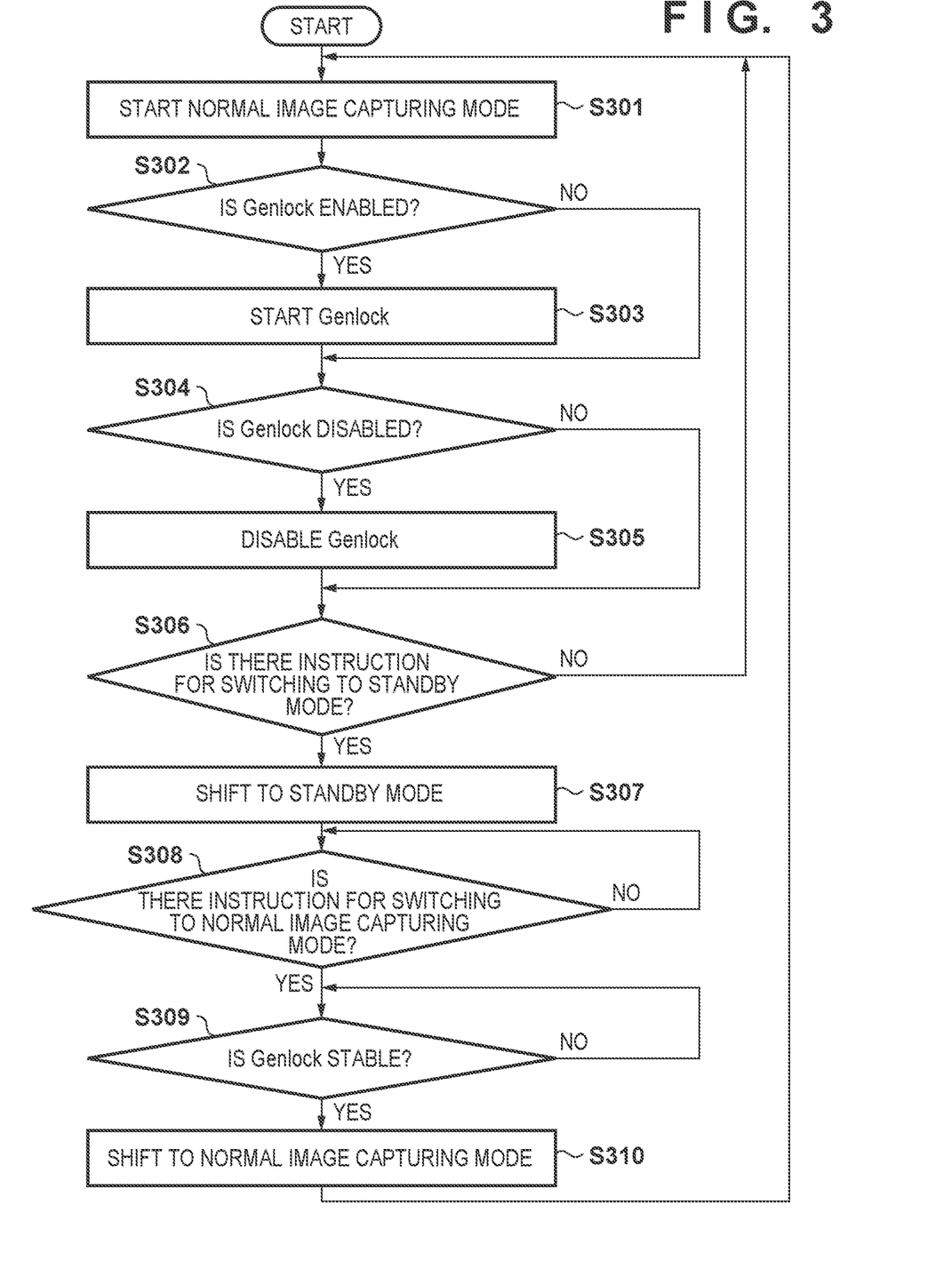
FIG. 3 is a flowchart showing an example of processing of the image capturing apparatus corresponding to the embodiment.

Next, the procedure of processing in this embodiment will be described with reference to the flowchart shown in FIG. 3. The processing corresponding to the flowchart in FIG. 3 is implemented by executing the programs (stored in the ROM 203 and the storage device 204) corresponding to the CPU 201 and functioning the programs as the system control unit 103, the standby mode control unit 108, and the Genlock control unit 110. In this embodiment, assume that activation of each camera 100, the controller 120, the display 130, and the synchronization signal output device 140 is completed, and the controller 120 is ready to receive an input operation from the user. In addition, the start condition of this flowchart is determined in accordance with an instruction from the user or automatically determined by each camera 100 after the activation of each camera 100.

In step S301, the system control unit 103 controls the respective blocks of each camera 100 and starts an operation in the normal image capturing mode. At this time, the standby mode control unit 108 sets the set value to 1 indicating the normal image capturing mode. After that, the standby mode control unit 108 monitors the standby mode switching instruction from the controller 120 via the communication unit 112 and sets the set value to 0 when the standby mode switching instruction is accepted.

In step S302, the Genlock control unit 110 determines whether the Genlock enabling instruction is accepted from the controller 120. If it is determined that the Genlock enabling instruction is accepted, the process advances to step S303. If it is determined that the Genlock enabling instruction is not accepted, the process advances to step S304.

In step S303, the Genlock control unit 110 starts the Genlock. In step S304, the Genlock control unit 110 determines whether the Genlock disabling instruction is accepted from the controller 120. If it is determined that the Genlock disabling instruction is accepted, the process advances to step S305. If it is not determined that the Genlock disabling instruction is accepted, the process advances to step S306.

In step S305, the Genlock control unit 110 disables the Genlock. In step S306, the system control unit 103 refers to the set value of the standby mode control unit 108 and determines whether the set value is 0 indicating that the instruction for switching the operation mode to the standby mode is accepted. If it is determined that the instruction for switching the operation mode to the standby mode is input, the process advances to step S307. After that, the standby mode control unit 108 monitors the instruction for switching the operation mode to the normal image capturing mode from the controller 120 via the communication unit 112. If it is determined that the instruction for switching the operation mode to the normal image capturing mode is input, the set value is set to 1. On the other hand, if the set value remains 1, and the instruction for switching the operation mode to the standby mode is not input, the process returns to step S301, and the normal image capturing mode is continued.

In step S307, the system control unit 103 controls the operations of the respective blocks of each camera 100 and shifts the operation mode from the normal image capturing mode for outputting the image data to the controller 120 to the standby mode for not performing the output. In step S308, the system control unit 103 refers to the set value of the standby mode control unit 108 and determines whether the set value is 1 indicating that the instruction for switching the operation mode to the normal image capturing mode is accepted. If the system control unit 103 determines that the instruction for switching the operation mode to the normal image capturing mode is input, the process advances to step S309. On the other hand, if it is determined that the instruction for switching the operation mode to the normal image capturing mode is not input, the determination processing in step S308 is repeated, and the system control unit 103 stands by to receive the instruction for switching the operation mode to the normal image capturing mode.

If the instruction for switching the operation mode to the normal image capturing mode is accepted, the Genlock stabilization determination unit 111 determines in step S309 whether the Genlock is stable. The determination method to determine whether the Genlock is stable has been described above. The determination may be performed based on the difference between the synchronization signals or the elapse of the time from the start of the Genlock. If it is determined that the Genlock is stable, the process advances to step S310. If it is not determined that the Genlock is stable, the determination processing in step S309 is continued. The Genlock stabilization determination unit 111 stands by until the Genlock becomes stable. If the Genlock stabilization is completed, the process advances to step S310. In step S310, the system control unit 103 controls the operations of the respective blocks of each camera 100 and performs processing for shifting the operation mode to the normal image capturing mode for outputting the image data to the controller 120.

According to the processing described above, if the operation mode of each camera 100 shifts from the standby mode to the normal image capturing mode, the image output is possible in a state in which the Genlock is stable immediately after the mode is shifted to the normal image capturing mode. Therefore, there is provided stable image output without disturbing the image immediately after the mode is shifted to the normal image capturing mode.

Second Embodiment

The second embodiment will be described below. The system arrangement of this embodiment is the same as that shown in FIG. 1. In addition, the functional arrangement of the apparatus constituting an image capturing system 10 is the same as that shown in FIGS. 2A and 2B. The constituent element similar to those of the first embodiment are denoted by the reference numerals already used, a detailed description thereof will be omitted, and differences from the first embodiment will mainly be described.

Figure 4:
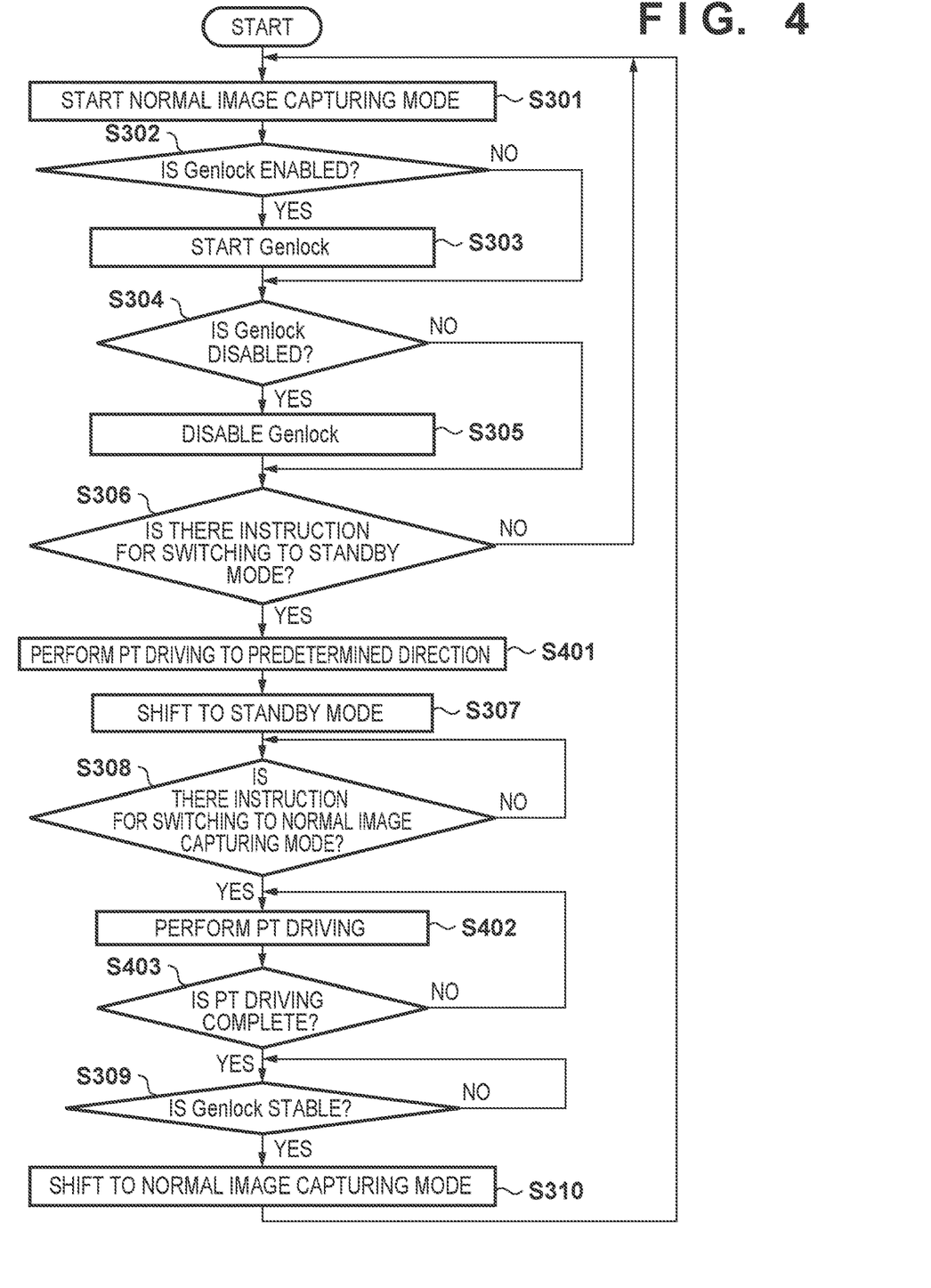
FIG. 4 is a flowchart showing an example of another processing of the image capturing apparatus corresponding to the embodiment.

First, FIG. 4 shows the flowchart corresponding to an example of processing corresponding to this embodiment. Processing in steps S301 to S310 in FIG. 4 is the same as steps S301 to S310 in FIG. 3, and a detailed description thereof will be omitted.

If an instruction for switching the operation mode to the standby mode is accepted in step S306, a system control unit 103 is operated via a speed control unit 107 in step S401 such that a pan driving unit 105 and a tilt driving unit 106 performs the pan/tilt operation so that the lens and the image capturing element of an image capturing unit 101 are directed in a predetermined first direction (for example, an opposite side, a backward side, or an arbitrary direction with respect to the image capturing direction in the normal image capturing mode). The system control unit 103 causes a storage unit 104 to retain the pan/tilt angles of the pan driving unit 105 and the tilt driving unit 106 which indicate the image capturing direction (the second direction) at the time of the start or immediately before the start of the pan/tilt operation. After that, the process advances to steps S307 and S308. Note that the operation for directing the image capturing direction to the first direction may be performed after the shift to the standby mode in step S307. If the instruction for switching the operation mode to the normal image capturing mode is accepted in step S308 after the shift to the standby mode, the process advances to step S402.

In step S402, the system control unit 103 controls the operations of the pan driving unit 105 and the tilt driving unit 106 via the speed control unit 107 so as to return to the second direction (pan/tilt angles) stored in the storage unit 104 in step S401. The system control unit 103 determines in step S403 whether the pan/tilt operations of the pan driving unit 105 and the tilt driving unit 106 are completed until the pan/tilt angles stored in step S401. If it is determined that the pan/tilt operations are completed, the process advances to step S309. If it is not determined that the pan/tilt operations are completed, the process returns to step S402 and PT driving is continued.

In this processing, the pan/tilt operations are changed to the predetermined first direction when the mode is shifted to the standby mode. After that, if the instruction for switching the operation mode to the normal image capturing mode is accepted, a time for stabilizing the Genlock can be ensured during the period of returning the pan/tilt operations to the original image capturing direction.

A case in which the pan/tilt angles are returned in step S402 to the original pan/tilt angles stored in step S401 has been described above, but this embodiment is not limited to this. For example, the pan/tilt operations may be performed to return to a predetermined angle (for example, the initial value of the control value of the pan driving unit 105 and the tilt driving unit 106, that is, the tilt/pan angle is 0°).

Figure 5A:
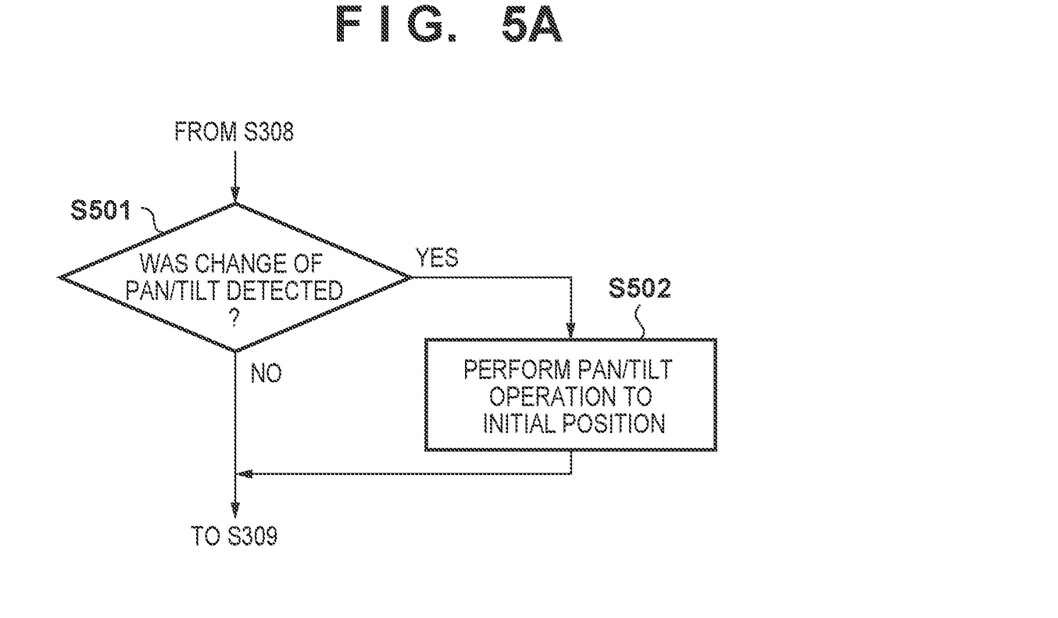
FIG. 5A is a flowchart showing an example of still another processing of the image capturing apparatus corresponding to the embodiment.

The pan/tilt operations in step S403 in this embodiment are assumed as the operation for returning the pan/tilt angles to the pan/tilt angles stored in step S401. However, this embodiment is not limited to this. For example, if the pan/tilt angles are changed by an external factor (for example, a camera collides against an object or a camera is directed to a predetermined direction by the user) of each camera 100 during the standby mode, processing for performing the pan/tilt operations to the initial position (the pan/tilt angle is 0°) as shown in FIG. 5A may be similarly assumed in place of processing in steps S401, S402, and S403. More specifically, after the instruction for switching the operation mode to the normal image capturing mode is accepted in step S308, the system control unit 103 determines in step S501 whether a change in the pan/tilt angle in at least one of the pan driving unit 105 and the tilt driving unit 106 is detected. If the change in the pan/tilt angle is detected, the process advances to step S502. In step S502, the system control unit 103 controls the pan driving unit 105 and the tilt driving unit 106 to perform the pan/tilt operations to the initial position (the pan/tilt angle is 0°). On the other hand, if it is not determined that the change in the pan/tilt angle is not detected, the process advances to step S309.

According to this embodiment as described above, if the operation mode is shifted from the standby mode to the normal image capturing mode, the Genlock can be stabilized while pan/tilt driving is being performed to return the pan/tilt angles to the pan/tilt angles corresponding to the predetermined image capturing direction. Therefore, if the Genlock is stabilized upon completion of the pan/tilt operations, the operation mode can be immediately returned from the standby mode.

Third Embodiment

The third embodiment will be described below. The system arrangement of this embodiment is the same as that shown in FIG. 1. In addition, the functional arrangement of the apparatus constituting an image capturing system 10 is the same as that shown in FIGS. 2A and 2B. The constituent element similar to those of the first embodiment are denoted by the reference numerals already used, a detailed description thereof will be omitted, and differences from the first embodiment will mainly be described.

Figure 5B:
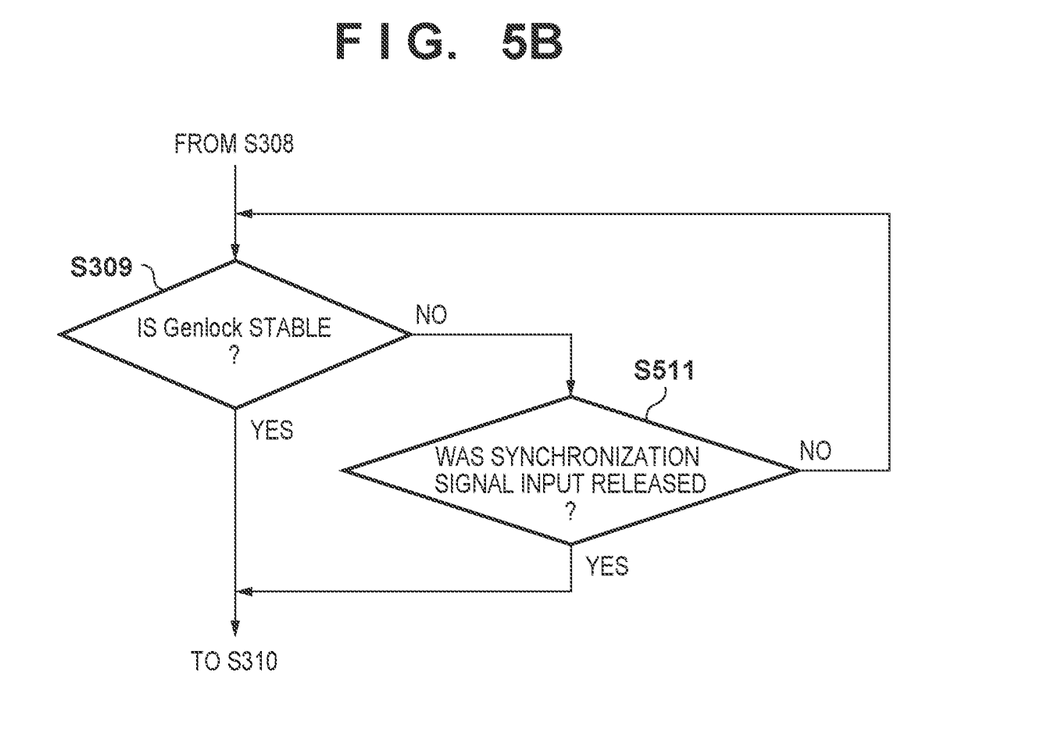
FIG. 5B is a flowchart showing an example of still another processing of the image capturing apparatus corresponding to the embodiment.

First, FIG. 5B shows the flowchart corresponding to an example of processing corresponding to this embodiment. Processing in step S511 in FIG. 5B is executed only if NO is determined in the processing in step S309 of FIG. 3. The remaining processing is the same as that shown in FIG. 3, and a detailed description thereof will be omitted.

A synchronization signal input unit 109 determines in step S511 whether the input of a synchronization signal input from a synchronization signal output device 140 is released. The release of the input of the synchronization signal can be considered, for example, to assume a state in which the connected between the synchronization signal output device 140 and each camera 100 is released, and no synchronization signal is input. If the release of the input is determined, the process advances to step S310 regardless of the determination result in step S309. If it is not determined that the input is released, the determination processing in step S309 is continued, and the operation stands by until the stabilization of the Genlock. If Genlock stabilization is completed, the process advances to step S310.

As has been described above, if the operation mode is shifted from the standby mode to the normal image capturing mode, and the input of the synchronization signal is released before the Genlock stabilization, the operation mode can be immediately shifted to the normal image capturing mode without waiting for the Genlock stabilization.

Advantageous embodiments of the present invention have been described above. However, the present invention is not limited to these embodiments, and various changes and modification may be made within the spirit and scope of the present invention.

The present invention is not limited to the above embodiments and various changes and modifications can be made within the spirit and scope of the present invention. Therefore, to apprise the public of the scope of the present invention, the following claims are made.

Other Embodiments

Embodiments of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-148448, filed on Sep. 3, 2020, which is hereby incorporated by reference herein in its entirety.

What is claimed is:

1. An image capturing apparatus comprising:
an image sensor used to capture an image; and
a computer executing instructions which, when executed by the computer, cause the image capturing apparatus to:
perform, in accordance with a synchronization signal which has been input, synchronization with the input synchronization signal so that the captured image is output to an external device in synchronism with the input synchronization signal; and
switch an operation mode of the image capturing apparatus between a first operation mode for outputting the captured image to the external device and a second operation mode for not outputting the captured image to the external device, in response to an instruction for switching the operation mode,
wherein in a case where an instruction for switching the operation mode from the second operation mode to the first operation mode has been input and the synchronization is stable, the operation mode is switched from the second operation mode to the first operation mode.

2. The image capturing apparatus according to claim 1, wherein even if the instruction for switching the operation mode from the second operation mode to the first operation mode has been input, the operation mode is not switched from the second operation mode to the first operation mode, in a case where the synchronization is not stable.

3. The image capturing apparatus according to claim 1, wherein the instructions cause the image capturing apparatus to determine whether the synchronization is stable,
wherein in a case where (i) an instruction for switching the operation mode from the second operation mode to the first operation mode has been input and (ii) it is determined that the synchronization is stable, the operation mode is switched from the second operation mode to the first operation mode.

4. The image capturing apparatus according to claim 3, wherein the instructions cause the image capturing apparatus to determine whether the synchronization is stable, in accordance with a determination result of determining whether an elapsed time period after the synchronization with the input synchronization signal is started reached a predetermined period.

5. The image capturing apparatus according to claim 3, wherein the instructions cause the image capturing apparatus to determine whether the synchronization is stable, in a case where an instruction for switching the operation mode from the second operation mode to the first operation mode has been input from the external device.

6. The image capturing apparatus according to claim 3, wherein the instructions cause the image capturing apparatus to control an image capturing direction of the image capturing apparatus,
wherein in response to switching of the operation mode from the first operation mode to the second operation mode, the image capturing direction is controlled so that the image capturing direction becomes a first direction,
the image capturing direction is controlled to a second direction different from the first direction in a case where the instruction for switching the operation mode from the second operation mode to the first operation mode has been input, and
the determination is performed after the image capturing direction becomes the second direction.

7. The image capturing apparatus according to claim 6, wherein the second direction is an image capturing direction in the first operation mode before the operation mode is switched to the second operation mode.

8. The image capturing apparatus according to claim 7, wherein the instructions cause the image capturing apparatus to store the second direction in a storage unit when the operation mode is switched from the first operation mode to the second operation mode.

9. The image capturing apparatus according to claim 6, wherein the second direction is an initial value of an image capturing direction of the image capturing apparatus which is controlled.

10. The image capturing apparatus according to claim 3, wherein in a case where the input synchronization signal is no longer input, the operation mode is switched from the second operation mode to the first operation mode regardless of a result of the determination.

11. The image capturing apparatus according to claim 1, wherein the instructions cause the image capturing apparatus to generate a synchronization signal, and perform the synchronization by synchronizing the generated synchronization signal and the input synchronization signal, and
wherein the instructions cause the image capturing apparatus to determine whether the synchronization is stable, based on the generated synchronization signal and the input synchronization signal.

12. The image capturing apparatus according to claim 5, wherein instructions cause the image capturing apparatus to determine, based on a difference between the generated synchronization signal and the input synchronization signal, whether the synchronization is stable.

13. A method executed at an image capturing apparatus comprising an image sensor used to capture an image, the method comprising:
performing, in accordance with a synchronization signal which has been input, synchronization with the input synchronization signal so that the captured image is output to an external device in synchronism with the input synchronization signal; and
switching an operation mode of the image capturing apparatus between a first operation mode for outputting the captured image to the external device and a second operation mode for not outputting the captured image to the external device, in response to an instruction for switching the operation mode,
in a case where an instruction for switching the operation mode from the second operation mode to the first operation mode has been input and the synchronization is stable, the operation mode is switched from the second operation mode to the first operation mode.

14. A non-transitory computer-readable storage medium storing instructions that, when executed by a processor of an image capturing apparatus, execute a method executed at the image capturing apparatus comprising an image sensor used to capture an image, the method comprising:
performing, in accordance with a synchronization signal which has been input, synchronization with the input synchronization signal so that the captured image is output to an external device in synchronism with the input synchronization signal;
switching an operation mode of the image capturing apparatus between a first operation mode for outputting the captured image to the external device and a second operation mode for not outputting the captured image to the external device, in response to an instruction for switching the operation mode,
in a case where an instruction for switching the operation mode from the second operation mode to the first operation mode has been input and the synchronization is stable, the operation mode is switched from the second operation mode to the first operation mode.

* * * * *